(12) United States Patent
Knausdorf et al.

(10) Patent No.: US 12,023,921 B2
(45) Date of Patent: Jul. 2, 2024

(54) AUTOMATED ENHANCEMENT OF PRINTED DOCUMENTS

(71) Applicant: Xerox Corporation, Norwalk, CT (US)

(72) Inventors: Peter Knausdorf, Henrietta, NY (US); Jack T. Lestrange, Macedon, NY (US); Palghat S. Ramesh, Pittsford, NY (US); Joseph C. Sheflin, Geneseo, NY (US); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 386 days.

(21) Appl. No.: 17/477,417

(22) Filed: Sep. 16, 2021

(65) Prior Publication Data

US 2023/0083713 A1 Mar. 16, 2023

(51) Int. Cl.
*B41J 2/045* (2006.01)
*H04N 1/00* (2006.01)
*H04N 1/409* (2006.01)
*H04N 1/58* (2006.01)
*H04N 1/60* (2006.01)
*B41J 2/21* (2006.01)

(52) U.S. Cl.
CPC ....... *B41J 2/04508* (2013.01); *B41J 2/04586* (2013.01); *H04N 1/0044* (2013.01); *H04N 1/4092* (2013.01); *H04N 1/58* (2013.01); *H04N 1/6097* (2013.01); *B41J 2/2114* (2013.01)

(58) Field of Classification Search
CPC ...... B41J 11/00; B41J 2/4508; B41J 2/04586; H04N 1/0044; H04N 1/4092; H04N 1/58; H04N 1/6097; C09D 11/40; C09D 11/322
See application file for complete search history.

(56) References Cited

U.S. PATENT DOCUMENTS

| | | | |
|---|---|---|---|
| 9,228,105 B2 | 1/2016 | Song et al. | |
| 9,973,654 B1 * | 5/2018 | Subbaian | ............. H04N 1/4092 |
| 10,277,756 B2 | 4/2019 | Spence et al. | |

* cited by examiner

*Primary Examiner* — Thinh H Nguyen

(57) ABSTRACT

An MFD is disclosed. For example, the MFD includes a printhead to dispense print material, an enhancement printhead to dispense an enhancement printing fluid, a processor and a non-transitory computer-readable medium storing a plurality of instructions. The instructions when executed by the processor cause the processor to perform operations that include determining that an automated enhancement feature was selected, analyzing each pixel of an image to be printed to determine one or more pixels that are to receive the enhancement printing fluid, controlling the printhead to print the image, and controlling the enhancement printhead to dispense the enhancement printing fluid on the one or more pixels that are to receive the enhancement printing fluid.

20 Claims, 5 Drawing Sheets

AUTOMATED ENHANCEMENT OF PRINTED DOCUMENTS

The present disclosure relates generally to printing documents, and relates more particularly to a method and apparatus to automatically add enhancements to selected portions of printed documents.

BACKGROUND

Printing devices can be used to print images onto a substrate. Images can be printed by dispensing printing fluid or toner onto desired portions of the substrate. A processor may control movement of a printhead and the amount of printing fluid that is dispensed on the selected portions of the substrate. The printing fluid may include various colors to print the image. Alternatively, laser printers may apply toner onto the desired portions of the substrate in black or various different colors and fuse the toner to print the image.

However, improving print quality without significant redesign and cost can be difficult. Images with a higher contrast between the darkest black to brightest white may appear more vibrant and real. This is due to the contrast ratios in real life being greater than any print can reproduce. Thus, to improve a printed image, the contrast ratio can be increased. However, increasing the contrast ratio of a printed image may be difficult.

SUMMARY

According to aspects illustrated herein, there are provided a multi-function device (MFD) and a method for automatically enhancing a printed document. One disclosed feature of the embodiments is an MFD that comprises a printhead to dispense print material, an enhancement printhead to dispense an enhancement printing fluid, a processor and a non-transitory computer-readable medium storing a plurality of instructions. The instructions when executed by the processor cause the processor to perform operations that include determining that an automated enhancement feature was selected, analyzing each pixel of an image to be printed to determine one or more pixels that are to receive the enhancement printing fluid, controlling the printhead to print the image, and controlling the enhancement printhead to dispense the enhancement printing fluid on the one or more pixels that are to receive the enhancement printing fluid.

Another disclosed feature is a method for automatically enhancing a printed document. The method executed by a processor of the MFD comprises determining that an automated enhancement feature was selected, analyzing each pixel of an image to be printed to determine one or more pixels that are to receive an enhancement printing fluid, dispensing print material to print the image, and dispensing the enhancement printing fluid on the one or more pixels that are to receive the enhancement printing fluid.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to automatically enhance a printed document. As discussed above, improving print quality without significant redesign and cost can be difficult. Images with a higher contrast between the darkest black to brightest white may appear more vibrant and real. This is due to the contrast ratios in real life being greater than any print can reproduce. Thus, to improve a printed image, the contrast ratio can be increased. However, increasing the contrast ratio of a printed image may be difficult.

The present disclosure provides the ability for users to automatically enhance printed images with an enhancement printing fluid. The user may select the auto enhancement feature on a user interface of an MFD of the present disclosure. The auto enhancement feature may automatically select pixels that are to receive the enhancement printing fluid to improve a contrast ratio of the image.

In one embodiment, the enhancement printing fluid may be a clear coat printing fluid that can be dispensed on dark pixels. For example, dark pixels may be pixels below a pixel color value threshold in an 8 bit color value system where 0 is black and 255 is white. In another embodiment, the enhancement printing fluid may be matte coat printing fluid.

Figure 1:
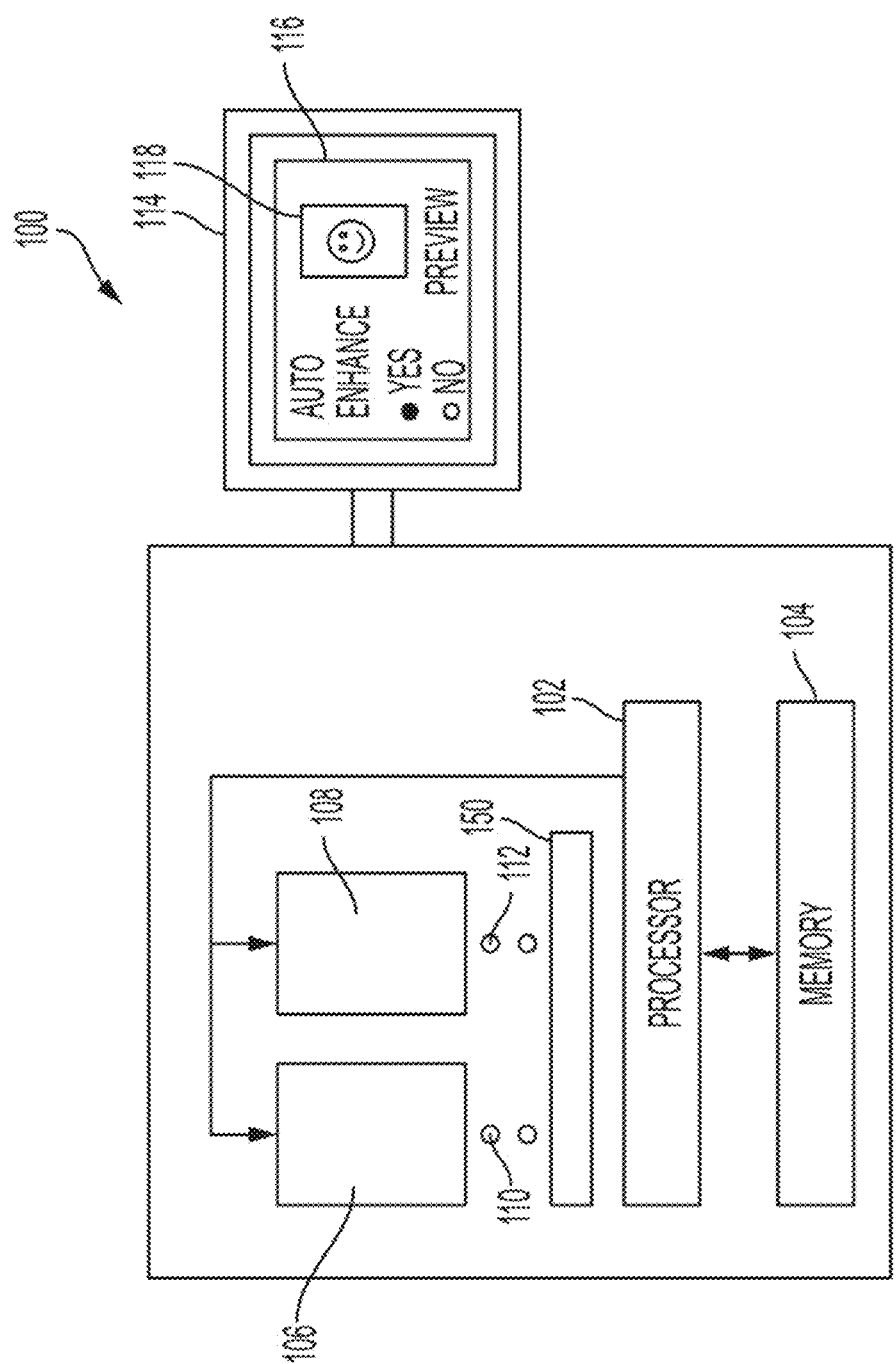
FIG. 1 illustrates a block diagram of an example MFD that includes a printhead to perform automated enhancements of printed documents in accordance with the present disclosure.

FIG. 1 illustrates an example multi-function device (MFD) 100 of the present disclosure. In one embodiment, the MFD 100 may include a processor 102, a memory 104, a printhead 106, an enhancement printing fluid printhead 108, and a display 114. The processor 102 may be communicatively coupled to the memory 104, the printhead 106, the enhancement printing fluid printhead 108, and the display 114.

In one embodiment, the memory 104 may be any type of non-transitory computer readable medium. For example, the memory 104 may be a hard disk drive, a solid state drive, a random access memory (RAM), a read-only memory (ROM), and the like.

The memory 104 may store various information. For example, the memory 104 may store instructions executed by the processor 102 to perform the functions described herein. The memory 104 may store the various processes and/or algorithms to automatically select pixels of an image that are to receive an enhancement printing fluid 112 dispensed by the enhancement printing fluid printhead 108. The memory 104 may also store thresholds used by the processor 102 to determine which pixels will be selected, as discussed in further details below.

In one embodiment, the processor 102 may control operation of the printhead 106 and the enhancement printing fluid printhead 108. The processor 102 may control the printhead 106 to dispense print material 110 onto a substrate 150 to print an image. In one embodiment, the substrate 150 may be paper. The present disclosure can improve the image quality for images printed on standard paper rather than requiring the use of glossy substrates that can be more expensive.

The printhead 106 may be an inkjet printhead, and the print material 110 may be a printing fluid or ink. For example, the printhead 106 may include a single color printhead (e.g., black) or a multi-color printhead that includes several different color ink reservoirs for different colors of ink. For example, the printhead 106 may be a cyan, yellow, magenta, and black (CYMK) printhead.

In one embodiment, several printheads 106 may be deployed that each hold a different color print material 110. For example, separate printheads 106 may be deployed for the cyan, yellow, magenta, and black colors. The processor 102 may control how much of each color is dispensed at a desired location on the substrate 150 to generate a particular color. The process may be repeated for various locations on the substrate 150 to print a desired image.

In one embodiment, the printhead 106 may be part of a laser printer, and the print material 110 may be toner. The toner may be dispensed by the printhead 106 on desired locations on the substrate 150 and fused to print the image.

The processor 102 may also control the enhancement printing fluid printhead 108 to dispense a desired amount of enhancement printing fluid 112 onto desired locations on the substrate 150. The enhancement printing fluid 112 may be a clear coat printing fluid or a matte coat printing fluid. An example of the enhancement printing fluid 112 may be a clear toner known as "Xerox Color/1000 Clear Toner." The enhancement printing fluid 112 may be dispensed at desired locations to increase a contrast of the image and to improve overall image quality. For example, adding the enhancement printing fluid 112 may allow the contrast between the darker colors and the lighter colors to be increased past a contrast level that is achievable by the color printing fluid 110 alone.

The locations on the substrate 150 that receive the enhancement printing fluid 112 may be determined based on the type of enhancement that is deployed. For example, the different types of enhancement may include a contrast enhancement, a feathered contrast enhancement, a border enhancement, an edge enhancement, or any combination thereof (e.g., a feathered border).

In one embodiment, the MFD 100 may operate by printing the image on the substrate 150 with the printhead 106 on a first pass. The MFD 100 may then dispense the enhancement printing fluid 112 on the determined subset of pixels of the image on a second pass. In another embodiment, the print material 110 and the enhancement printing fluid 112 may be dispensed on a single pass. For example, the print material 110 may be dispensed on a location and then the enhancement printing fluid 112 may be dispensed on the same location, if necessary. The printhead 106 and the enhancement printing fluid printhead 108 may be moved to the next location to dispense the print material 110 and/or the enhancement printing fluid 112, and so forth until the image is printed with the desired enhancement.

In one embodiment, the display 114 may include a graphical user interface (GUI) 116. The display 114 may be a touch screen display or may include a separate input device (e.g., a keyboard, a track pad, a mouse, and the like). The GUI 116 may present a window to allow a user to enable an auto enhancement feature of the MFD 100. When the auto enhancement feature is enabled, another window (not shown) may present the different types of auto enhancements that are available and allow the user to select one of the different types of auto enhancements.

In one embodiment, the GUI 116 may present a preview screen 118. The preview screen 118 may show a preview image of the image to be printed with the automatic enhancement. When the auto enhancement feature is removed or de-selected, the preview screen 118 may then change to show the image to be printed without the automatic enhancement.

In one embodiment, the GUI 116 may also include an interface to adjust a level of enhancement that is applied. For example, the interface may be a dial, a slider bar, a box to enter a percentage, and the like that may adjust the amount of enhancement. For example, the user may want a partial enhancement applied to the printed image. The GUI 116 may allow the user to adjust the level of enhancement, and the GUI may also present the preview screen 118 with how the image may appear with the partial enhancement set by the user.

It should be noted that the MFD 100 of the present disclosure has been simplified for ease of explanation and may include additional components that are not shown. For example, the MFD 100 may include additional components, such as an optical scanner to perform scan and copy functions. The MFD 100 may include a network interface to establish a wired or wireless network connection to the Internet or to transmit emails. The MFD 100 may include paper trays, a digital front end (DFE) to convert print job requests into a printer description language (PDL), and the like.

Figure 2:
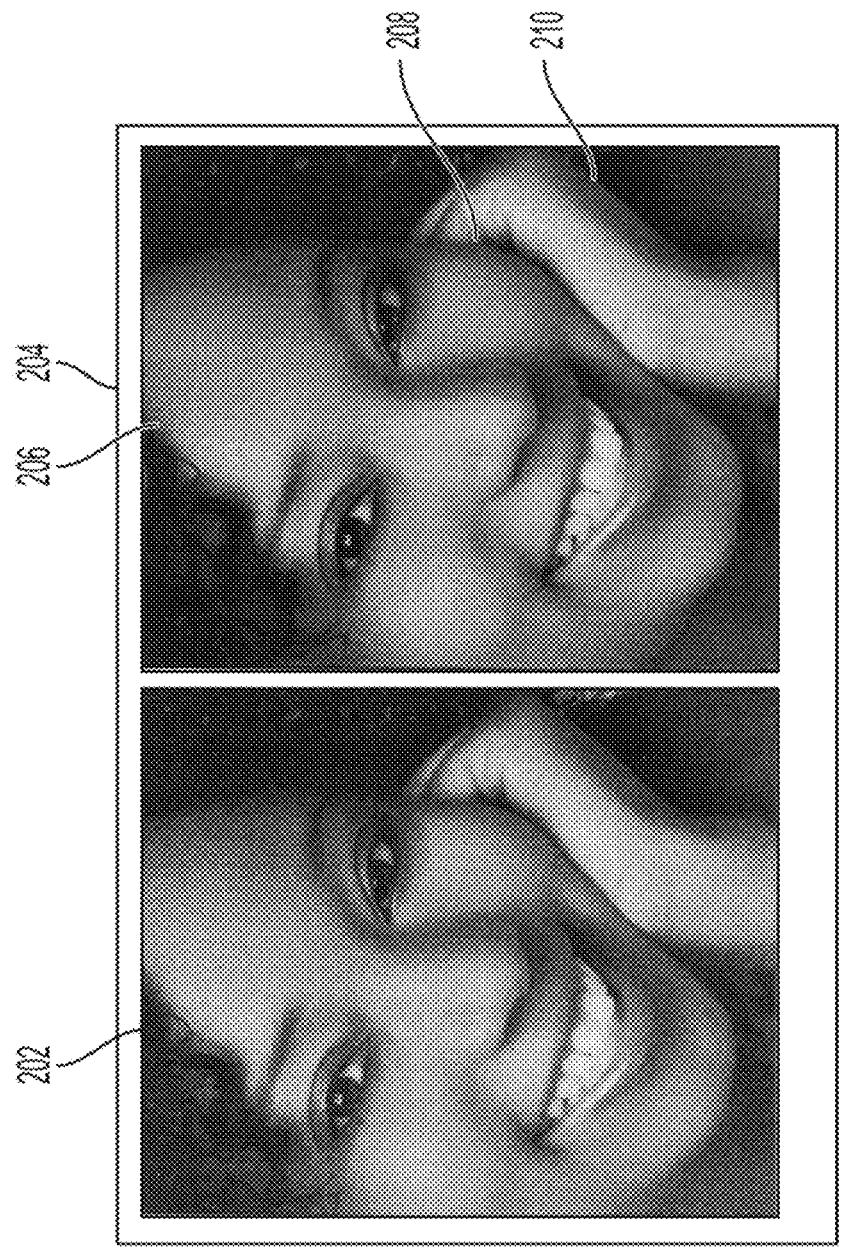
FIG. 2 illustrates a comparison of images with and without the enhancement of the present disclosure.

FIG. 2 illustrates an example image 202 without the automatic enhancement and an example image 204 with the automatic enhancement. In an example, the image 204 has received a contrast enhancement where "dark" pixels (e.g., pixels having a color value below a threshold where a value of 0 is black) are located. As can be seen in the comparison between the image 202 and the image 204, the image 204 has darker blacks. Thus, the contrast level in the image 204 is increased and appears more natural compared to the image 202.

Figure 3:
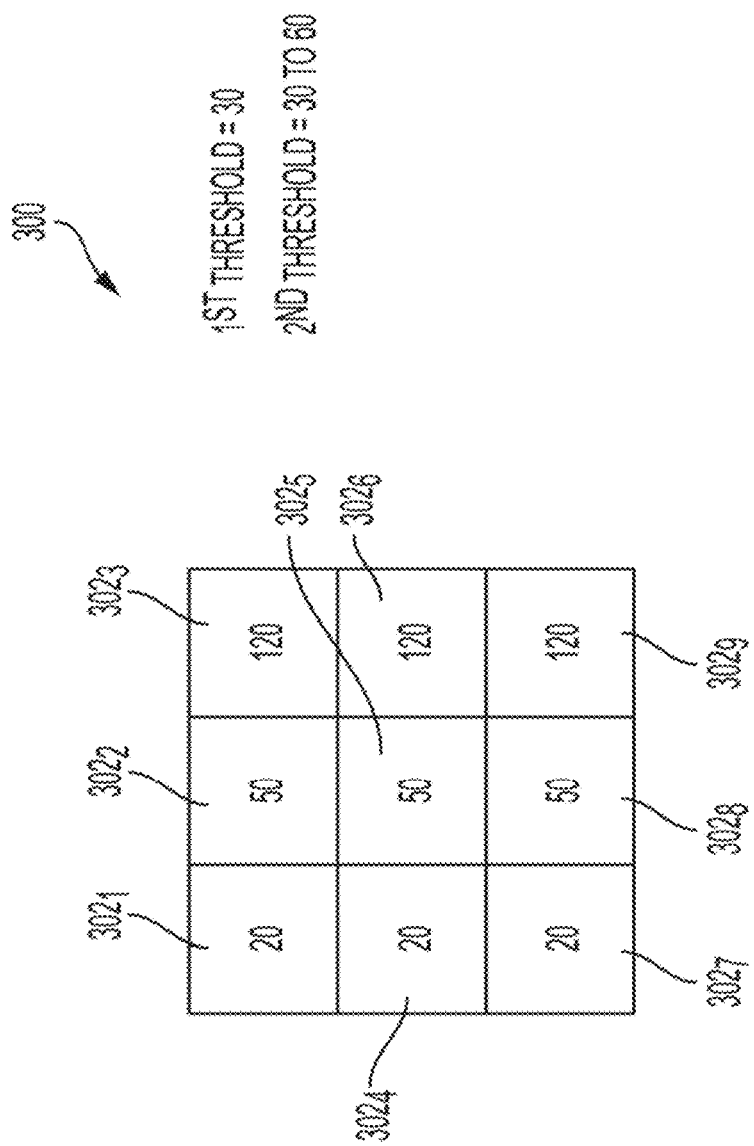
FIG. 3 illustrates a block diagram of an example analysis of pixels to determine which pixels receive the enhancement of the present disclosure.

FIG. 3 illustrates examples of the automatic enhancement can be performed by the processor 102. As noted above, there may be different types of automatic enhancement that can be applied. The different types may include a contrast enhancement, a feathered contrast enhancement, a border enhancement, or an edge enhancement.

In one example, the automatic enhancement may be performed by analyzing each pixel of an image to be printed to determine which pixels may receive the enhancement printing fluid 112. FIG. 3 illustrates an example portion of an image 300 with pixels $302_1$ to $302_9$ (hereinafter also referred to individually as a pixel 302 or collectively as pixels 302). Although nine pixels are illustrated in FIG. 3 as an example, it should be noted that the image to be printed may include many more pixels (e.g., thousands).

The examples described in FIG. 3 are based on an 8 bit color scheme where each pixel 302 may have a color value between 0 and 255. The value of 0 may be associated with a black color and the value of 255 may be associated with a white color. The example illustrated in FIG. 3 illustrates each pixel 302 having a single color value (e.g., the image may be a black and white image). However, it should be noted that the analysis may be extended to full color (e.g., red, green, and blue (RGB)) images where each pixel 302 has three color values for red, green, and blue, or any other color scheme.

In one embodiment, for the contrast enhancement a threshold value may be set and stored in the memory 104. In an example, the first threshold of 30, illustrated in FIG. 3, may be set as the threshold value. The processor 102 may determine the color value of each pixel 302 and compare the color value to the threshold (e.g., 30). If the color value of the pixel 302 is below the threshold value, then the pixel 302 may receive the enhancement printing fluid 112. In the example illustrated in FIG. 3, the pixels $302_1$, $302_4$, and $302_7$ may be identified or determined to be the one or more pixels 302 that may receive the enhancement printing fluid 112.

In one embodiment, for the feathered contrast enhancement, multiple threshold values may be set, and the enhancement printing fluid 112 may be gradually added towards the darkest pixels. In an example, the enhancement printing fluid 112 may be "feathered" in by dispensing the enhancement printing fluid 112 in a halftone pattern.

For example, FIG. 3 illustrates a first threshold of 30 and a second threshold of 30 to 60. The pixels 302 with a color value below the first threshold value of 30 may reach receive the enhancement printing fluid 112. The pixels 302 with a color value within the second threshold of 30 to 60 may receive the enhancement printing fluid 112 in a halftone pattern.

Using the image 300 as an example, the pixels $302_1$, $302_4$, and $302_7$ may have a color value below the first threshold of 30. As a result, the pixels $302_1$, $302_4$, and $302_7$ may each receive the enhancement printing fluid 112. The pixels $302_2$, $302_5$, and $302_8$ may have a color value within the second threshold of 30 to 60. As a result, the pixels $302_2$, $302_5$, and $302_8$ may receive the enhancement printing fluid 112 in a halftone pattern. In other words, the pixel $302_2$ may receive the enhancement printing fluid 112, the pixel $302_5$ may be skipped, and the pixel $302_8$ may receive the enhancement printing fluid 112.

In one embodiment, the enhancement printing fluid 112 may be "feathered" in across more than two lines. For example, a third threshold value may be used to dispense the enhancement printing fluid 112 every third pixel, and so forth. As a result, the enhancement printing fluid 112 may be gradually applied from a less dense pattern (every other pixel 302 or fewer than all of the pixels 302 that fall below an intermediate threshold) to a fully dense pattern (e.g., every pixel 302 that falls below the first threshold).

As noted above, the contrast enhancement and feathered contrast enhancement may be applied to color images as well. When color pixels are analyzed, each color may be associated with a threshold. For example, in an RGB image, there may be a first threshold of 30 for red, green, and blue. In another embodiment, the first threshold values may be different. For example, the first threshold value may be 30 for red, 50 for green and 20 for blue. Thus, the each color pixel may be analyzed and compared to the respective color thresholds to determine which color pixels are to be identified as the subset of pixels that may receive the enhancement printing fluid 112.

Another type of enhancement may be an edge enhancement. For example, rather than adding the enhancement printing fluid 112 based on color value, the enhancement printing fluid 112 may be dispensed based on a location of the pixel 302. For example, an edge detection function (e.g., the Canny Edge Detection algorithm) may be applied to the image 300 to determine the edges of an object within the image 300. The enhancement printing fluid 112 may be dispensed on pixels located along portions defined as an edge to provide a "glossy edge pop".

For example, referring back to FIG. 2 in the image 204, the edges may be locations that outline an object. For example, the image 204 shows example edges 206, 208, and 210. The edge 206 may be a line that separates the hair from the forehead. The edge 208 may be a line that separates the hand from the cheek. The edge 210 may be a line that separates the back of the hand from the dark background, and so forth. Thus, the enhancement printing fluid 112 may be dispensed on the pixels along the edges 206, 208, and 210, as well as along any other edges that are detected within the image 204.

Another type of enhancement may be a border enhancement. The border enhancement may dispense the enhancement printing fluid 112 around the outer sides of the image 300 to create a frame pop. The border may be any shape, such as a rectangle, a square, a circle, and the like. The border may be in the shape of an object, such as a heart. In one embodiment, the border may also be feathered via half-toning like the feathered contrast enhancement.

For example, in FIG. 3, for a square border, the pixels 302 around the outer sides may receive the enhancement printing fluid 112 to create the "border pop". In other words, the pixels $302_1$, $302_2$, $302_3$, $302_4$, $302_6$, $302_8$, and $302_9$ may receive the enhancement printing fluid 112. The border enhancement may include any number of lines of pixels around the outside of the image based on a desired thickness of the border. For example, the outer two lines around the image, the outer 3 lines around the image, and so forth may receive the enhancement printing fluid 112 to apply the border enhancement.

Thus, the present disclosure allows users to automatically apply an enhancement to a printed image to improve the contrast and image quality of the printed image. In other words, unlike other software programs that can adjust a printed image after printing and require the user to select the areas or pixels that are to be enhanced, the present disclosure may perform the enhancement with the same MFD 100 that prints the image. In addition, the present disclosure allows a user to simply enable the enhancement feature and the MFD 100 may automatically select the pixels that are to receive the enhancement printing fluid 112 based on the type of enhancement that is selected.

Thus, the present disclosure provides automated enhancement of images printed on standard paper or matte substrates in a more cost efficient manner. The enhancements can be applied on demand via selectable options presented on a GUI of the MFD 100.

Figure 4:
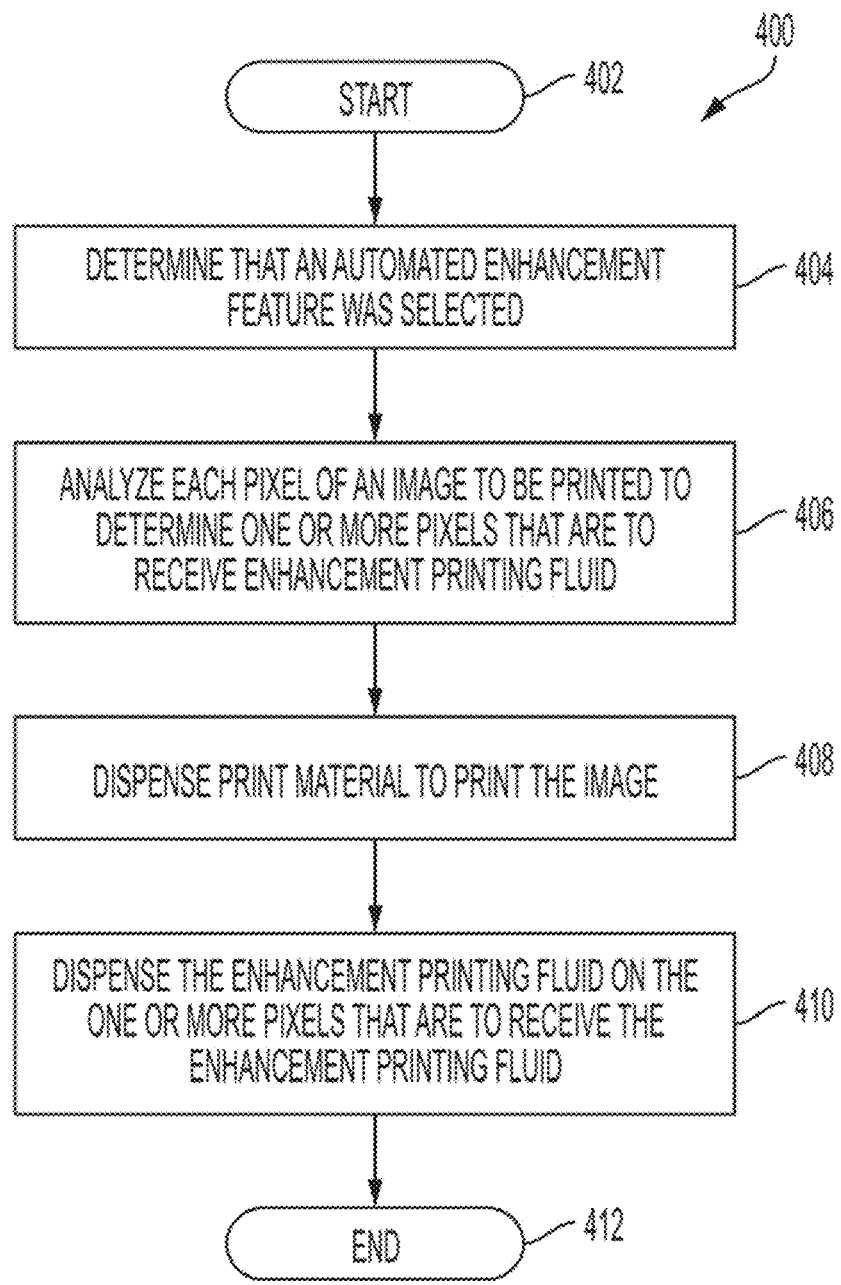
FIG. 4 illustrates a flow chart for a method of automatically enhancing a printed document of the present disclosure.

FIG. 4 illustrates a flow chart of an example method 400 for automatically enhancing a printed document of the present disclosure. In one embodiment, the method 400 may be performed by the MFD 100 or by an apparatus such as the apparatus 500 illustrated in FIG. 5 and discussed below.

In one embodiment, the method 400 begins at block 402. At block 404, the method 400 determines that an automated enhancement feature was selected. For example, the user may be presented with options for automated enhancement via a GUI shown on a display of the MFD. The user may select an automated enhancement feature to be applied to a printed image. Different types of automated enhancement features may be selected. For example, the different types of automated enhancement features may include a contrast enhancement, a feathered contrast enhancement, a border enhancement, or an edge enhancement.

At block 406, the method 400 analyzes each pixel of an image to be printed to determine one or more pixels that are to receive an enhancement printing fluid. In one embodiment, the color value of each pixel may be determined and compared to a threshold to determine if the pixel will receive an enhancement printing fluid. The enhancement printing fluid may be a clear coat printing fluid or a matte coat printing fluid. In one embodiment, the multiple threshold values may be used if the enhancement is to be feathered in gradually. The enhancement printing fluid may be "feathered in" using a halftone process for pixels that fall within the second threshold, as described above.

In one embodiment, each pixel may be analyzed to determine a location of the pixel. For example, for edge enhancement or border enhancement, the pixel's location may determine whether or not the pixel is to receive the enhancement printing fluid.

At block 408, the method 400 dispenses print material to print the image. For example, print material may be dispensed at desired locations to print the image onto the substrate.

At block 410, the method 400 dispenses the enhancement printing fluid on the one or more pixels that are to receive the enhancement printing fluid. For example, the subset of pixels within the image that are identified based on the analysis performed in block 406 may receive the enhancement printing fluid.

In one embodiment, the operations of block 408 may be performed in a first pass across the substrate. The substrate may then pass back through the MFD and the operations of block 410 may be performed via a second pass. In one embodiment, the operations of block 408 and the operations of block 410 may be performed in a single pass. For example, a location of the substrate associated with a pixel may receive the print material and/or the enhancement printing fluid. The next location on the substrate associated with a second pixel may receive the color printing and/or the enhancement printing fluid, and so forth.

In addition, it should be noted that the method 400 is performed by a single MFD. For example, the MFD may include printheads to dispense both the print material and the enhancement printing fluid. Thus, a user does not need to perform the enhancement to the printed image on another device using a third party software program. Rather, the enhancement can be performed on the MFD by selecting one of the available automatic enhancement options available on the MFD. At block 412, the method 400 ends.

Figure 5:
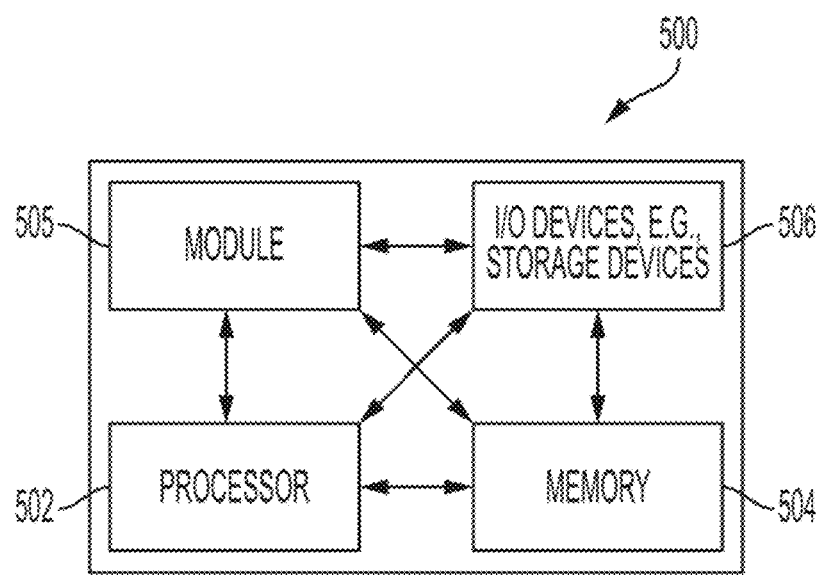
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for automatically enhancing a printed document, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for automatically enhancing a printed document (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for automatically enhancing a printed document (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
   a printhead to dispense a print material;
   an enhancement printhead to dispense an enhancement printing fluid;
   a processor; and
   a non-transitory computer-readable medium storing a plurality of instructions, which when executed by the processor, causes the processor to perform operations comprising:
   determining that an automated enhancement feature was selected;
   analyzing each pixel of an image to be printed to determine one or more pixels that are to receive the enhancement printing fluid in addition to the print material that is different from the enhancement printing fluid;
   controlling the printhead to dispense the print material to print the image; and
   controlling the enhancement printhead to dispense the enhancement printing fluid on the one or more pixels that are to receive the enhancement printing fluid.

2. The MFD of claim 1, further comprising:
   a display to show a preview of the image with and without the automated enhancement feature or to include an interface to adjust a level of enhancement.

3. The MFD of claim 1, wherein the enhancement printing fluid comprises a glossy clear coat.

4. The MFD of claim 1, wherein the enhancement printing fluid comprises a matte finish coat.

5. The MFD of claim 1, wherein the controlling the printhead and the controlling the enhancement printhead comprise dispensing the print material and the enhancement printing fluid on a single pass.

6. The MFD of claim 1, wherein the controlling the printhead is performed via a first pass and the controlling the enhancement printhead is performed on a second pass.

7. The MFD of claim 1, wherein the analyzing comprises:
determining a color value of the each pixel; and
determining the one or more pixels that are to receive the enhancement printing fluid based on the one or more pixels having the color value below a threshold.

8. The MFD of claim 1, wherein the analyzing comprises:
determining a border around the image to be printed; and
determining the one or more pixels that are to receive the enhancement printing fluid based on the one or more pixels being included in the border.

9. The MFD of claim 1, wherein the analyzing comprises:
detecting edges of the image to be printed; and
determining the one or more pixels that are to receive the enhancement printing fluid based on the one or more pixels being included in the edges.

10. The MFD of claim 1, wherein the analyzing comprises:
determining a color value of the each pixel;
determining a first subset of the one or more pixels that are to receive the enhancement printing fluid based on the first subset of the one or more pixels having the color value below a first threshold; and
determining a second subset of the one or more pixels that are to receive the enhancement printing fluid in a halftone pattern based on the second subset of the one or more pixels having the color value above the first threshold, but below a second threshold that is greater than the first threshold.

11. A method, comprising:
determining, via a processor, that an automated enhancement feature was selected;
analyzing, by the processor, each pixel of an image to be printed to determine one or more pixels that are to receive an enhancement printing fluid in addition to a print material that is different from the enhancement printing fluid;
dispensing, by the processor, the print material to print the image; and
dispensing, by the processor, the enhancement printing fluid on the one or more pixels that are to receive the enhancement printing fluid.

12. The method of claim 11, wherein the enhancement printing fluid comprises a glossy clear coat.

13. The method of claim 11, wherein the enhancement printing fluid comprises a matte finish coat.

14. The method of claims claim 11, wherein the dispensing the print material and the dispensing the enhancement printing fluid are performed on a single pass.

15. The method of claim 11, wherein the dispensing the print material is performed on a first pass, and the dispensing the enhancement printing fluid is performed on a second pass.

16. The method of claim 11, wherein the analyzing comprises:
determining, by the processor, a color value of the each pixel; and
determining, by the processor, the one or more pixels that are to receive the enhancement printing fluid based on the one or more pixels having the color value below a threshold.

17. The method of claim 11, wherein the analyzing comprises:
determining, by the processor, a border around the image to be printed; and
determining, by the processor, the one or more pixels that are to receive the enhancement printing fluid based on the one or more pixels being included in the border.

18. The method of claim 11, wherein the analyzing comprises:
detecting, by the processor, edges of the image to be printed; and
determining, by the processor, the one or more pixels that are to receive the enhancement printing fluid based on the one or more pixels being included in the edges.

19. The method of claim 11, wherein the analyzing comprises:
determining, by the processor, a color value of the each pixel;
determining, by the processor, a first subset of the one or more pixels that are to receive the enhancement printing fluid based on the first subset of the one or more pixels having the color value below a first threshold; and
determining, by the processor, a second subset of the one or more pixels that are to receive the enhancement printing fluid in a halftone pattern based on the second subset of the one or more pixels having the color value above the first threshold, but below a second threshold that is greater than the first threshold.

20. A multi-function device (MFD), comprising:
a printhead to dispense a print material;
an enhancement printhead to dispense an enhancement printing fluid;
a processor; and
a non-transitory computer-readable medium storing a plurality of instructions, which when executed by the processor, causes the processor to perform operations comprising:
determining a type of automated enhancement feature that was selected, wherein the type of automated enhancement feature that was selected comprises at least one of: a contrast enhancement, a feathered contrast enhancement, a border enhancement, or an edge enhancement;
analyzing each pixel of an image to be printed to determine one or more pixels that are to receive the enhancement printing fluid, in addition to the print material that is different from the enhancement printing fluid, in accordance with the type of automated enhancement feature that was selected;
controlling the printhead to dispense the print material to print the image; and
controlling the enhancement printhead to dispense the enhancement printing fluid on the one or more pixels that are to receive the enhancement printing fluid.

* * * * *